US010505416B2

United States Patent
Leonardi et al.

(10) Patent No.: US 10,505,416 B2
(45) Date of Patent: Dec. 10, 2019

(54) PATTERNED OFFSET POLE ROTOR

(71) Applicant: Ford Global Technologies, LLC, Dearborn, MI (US)

(72) Inventors: Franco Leonardi, Dearborn Heights, MI (US); Feng Liang, Troy, MI (US); Michael W. Degner, Novi, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 114 days.

(21) Appl. No.: 15/808,045

(22) Filed: Nov. 9, 2017

(65) Prior Publication Data

US 2019/0140501 A1   May 9, 2019

(51) Int. Cl.
  *H02K 21/12* (2006.01)
  *H02K 1/27* (2006.01)
  *H02K 29/03* (2006.01)

(52) U.S. Cl.
  CPC ........... *H02K 1/2766* (2013.01); *H02K 29/03* (2013.01); *H02K 2201/06* (2013.01)

(58) Field of Classification Search
  CPC ... H05K 1/2766; H02K 29/03; H02K 2201/06
  USPC .................................................. 310/156.47
  See application file for complete search history.

(56) References Cited

U.S. PATENT DOCUMENTS

| | | | | |
|---|---|---|---|---|
| 4,769,567 | A * | 9/1988 | Kurauchi | H02K 21/14 310/156.45 |
| 8,362,668 | B2 * | 1/2013 | Takahashi | H02K 1/2766 310/156.47 |
| 8,884,485 | B2 * | 11/2014 | Jurkovic | H02K 1/2766 310/156.47 |
| 9,035,522 | B2 | 5/2015 | Liang et al. | |
| 9,287,742 | B2 * | 3/2016 | Reddy | H02K 1/272 |
| 9,634,530 | B2 | 4/2017 | Klein et al. | |
| 9,641,033 | B2 | 5/2017 | Papini et al. | |
| 2002/0074887 | A1 * | 6/2002 | Takano | H02K 1/276 310/156.53 |
| 2010/0026128 | A1 * | 2/2010 | Ionel | H02K 1/276 310/156.53 |
| 2010/0277027 | A1 | 11/2010 | Kaiser et al. | |
| 2011/0285239 | A1 * | 11/2011 | Leonardi | H02K 1/2766 310/156.53 |
| 2014/0265702 | A1 | 9/2014 | Li | |
| 2017/0093237 | A1 * | 3/2017 | Tsuda | H02K 21/14 |

* cited by examiner

*Primary Examiner* — Yuriy Semenenko
(74) *Attorney, Agent, or Firm* — Dave Kelley; Brooks Kushman P.C.

(57) ABSTRACT

A rotor assembly has a rotor including a plurality of laminations each defining a plurality of poles arranged such that values of a pair of angles corresponding to each of the poles and defined between a magnetic axis of the pole and respective interpolar axes adjacent thereto are different. The values of the pairs define a repeating sequence around the lamination. The angles opposite an axis of rotation of the rotor are equal.

9 Claims, 11 Drawing Sheets

PATTERNED OFFSET POLE ROTOR

TECHNICAL FIELD

The present disclosure relates to systems and methods for arrangement of poles in a rotor lamination of an electric machine.

BACKGROUND

Extended drive range technology for electrified vehicles, such as battery electric vehicles ("BEVs") and plug in hybrid vehicles ("PHEVs"), is continuously improving. Achieving these increased ranges, however, often requires traction batteries and electric machines to have higher power outputs, and associated thermal management systems to have increased capacities in comparison to previous BEVs and PHEVs.

Electric machines including permanent magnets (also referred to as, permanent magnet motors) may have high efficiency, making them potentially suitable for use in traction motors for hybrid and electric vehicles. The design and choice of the permanent magnet is important in this type of motor. Rare-earth permanent magnets, such as neodymium (Nd) magnets, are often used in the traction motors in electric vehicles due to their high flux density and high anti-demagnetizing ability compared with traditional non-rare-earth magnets, such as alnico (iron alloys including aluminum, nickel, and cobalt) and ferrite. Rare-earth permanent magnets may contain a large amount of rare-earth elements, e.g., at least 30 wt % in some commercial magnets.

SUMMARY

A rotor assembly has a rotor including a plurality of laminations each defining a plurality of poles arranged such that values of a pair of angles corresponding to each of the poles and defined between a magnetic axis of the pole and respective interpolar axes adjacent thereto are different. The values of the pairs define a repeating sequence around the lamination. And, the angles opposite an axis of rotation of the rotor are equal.

A rotor assembly has a plurality of laminations each defining a plurality of poles arranged such that values of a pair of angles corresponding to each of the poles and defined between a magnetic axis of the pole and respective interpolar axes adjacent thereto are different. The values of an odd number of consecutive pairs define a repeating sequence around the lamination.

A rotor assembly has a plurality of laminations defining a center opening sized to receive a shaft therethrough along a rotation axis, and defining a plurality of magnet openings sized to receive permanent magnets to form magnetic poles. The magnet openings are arranged such that pairs of angles defined between a magnetic axis corresponding to each of the poles and interpolar axes adjacent thereto are different in value. The values of the pairs define a repeating sequence around the lamination.

DETAILED DESCRIPTION

Figure 1:
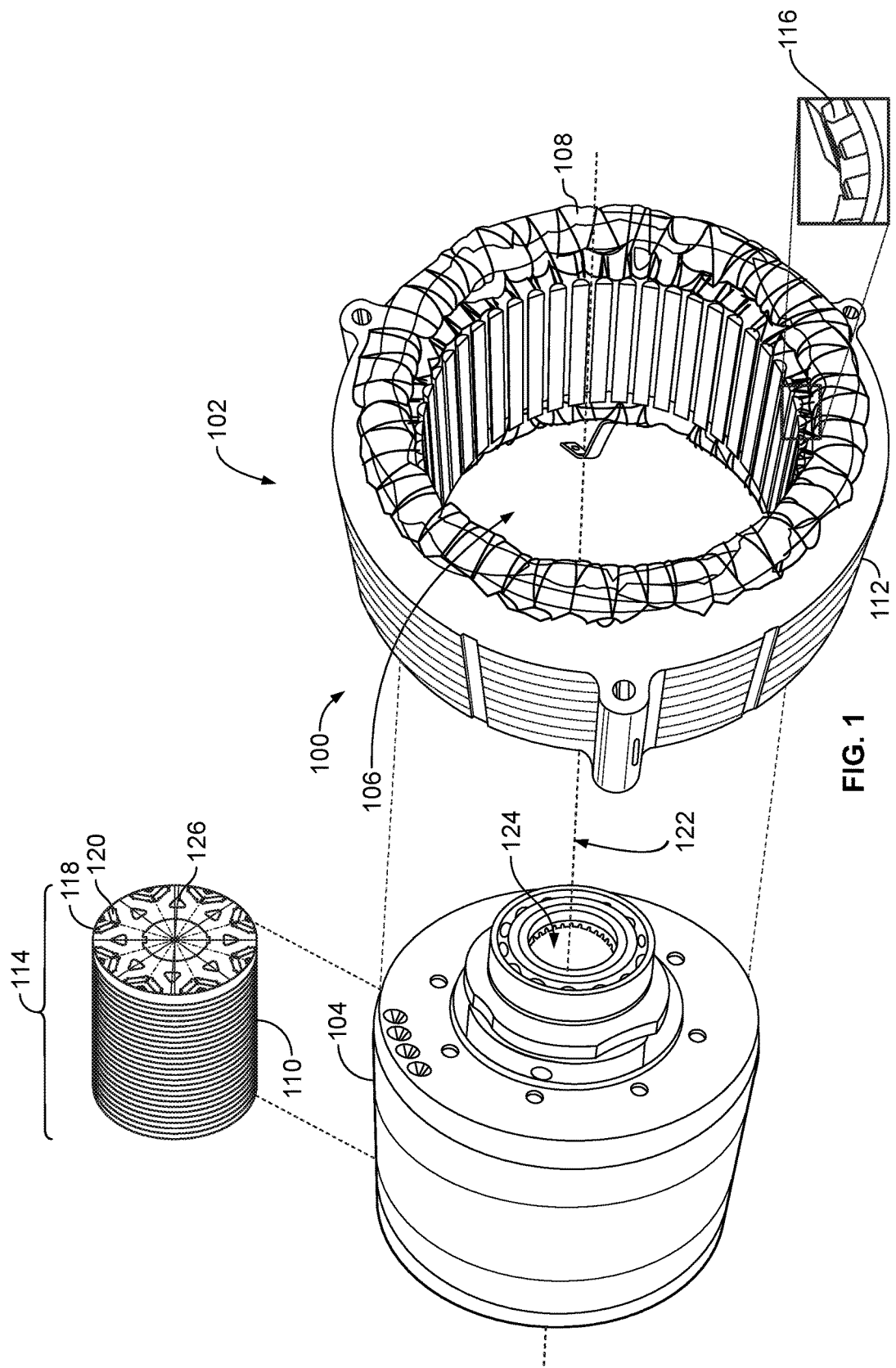
FIG. 1 is a block diagram illustrating an electric machine including a plurality of rotor laminations.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Efforts to reduce magnitude of torque ripple via rotor skewing may include offsetting (rotating) half of the rotor lamination stack with respect to the other half. As one example, laminations of a rotor operating in a 48-slot stator may be arranged with respect to one another such that their relative skew angle measures 3.75 degrees. This approach may assist in reducing a torque ripple component resulting from slotting of the stator. Furthermore, variations of this method have been introduced to address second-order effects such as rotor and stator torsional deformation that the skewing itself may introduce.

The rotor may be divided into a predefined number of axial sections k which may be rotated with respect to one another by an angle of a predefined magnitude (skew angle). A maximum number of the skew angles in a given rotor may be based on a total number k of axial sections in that rotor. The respective angles between the magnetic axis of adjacent poles may be the same for all adjacent poles of a given rotor, e.g., 45 degrees for an 8-pole rotor design. Furthermore, each of the angles between the magnetic axis and the interpolar axis determined based on one-half of the value of the previous angle may also be the same as one another, e.g., 22.5 degrees for an 8-pole rotor design. In such an arrangement, the magnetic axis of each magnet coincides with the rotor d-axis and the interpolar axis with the q-axis.

Radial skewing may be a skewing methodology realized within the lamination itself by offsetting the magnetic axis of a rotor pole with respect to the adjacent one. The radial skewing method may be especially valuable in application with integrated starter generator (ISG) motors, where the stack length may be shorter relative to that of other motor types and axial skewing techniques may not produce a desired improved performance. Furthermore, radial skewing may be applied with equal effectiveness to other types of permanent magnet (PM) machines and may cause further reduction of torque ripple. Unlike with axial skewing where a number of skewing angles is limited by a number k of axial sections the rotor may be divided into, the radial skewing method applied to a given rotor may have a number degrees of freedom that is based on a number of poles in that rotor.

Furthermore, maintaining symmetry of the magnet arrangement with respect to the rotating axis may be beneficial in achieving a desired level of rotor balancing, noise vibration and harshness (NVH), and harmonics in the magnetic flux and in the induced voltage.

FIG. 1 illustrates an example electric machine 100 for an electrified vehicle, referred to generally as an electric machine 100 herein. The electric machine 100 may include a stator 102 and a rotor 104. In some instances, electrified vehicles may include two electric machines 100. One of the electric machines 100 may function primarily as a motor and the other may function primarily as a generator. The motor may operate to convert electricity to mechanical power and the generator may operate to convert mechanical power to electricity.

The stator 102 may define a cavity 106 sized to receive the rotor 104 for operation therein. A shaft (not shown) may be operably connected to the rotor 104 to drive rotation thereof. In some examples, the rotor 104 and the stator 102 may comprise one or more ferrous laminations 110, 112, respectively. Furthermore, the laminations 110, 112 may be arranged in a stacked 114 manner and be further interlocked or loose with respect to one another.

The stator lamination 112 may define a plurality of depressions (slots) 116 radially extending from the inner periphery of the stator lamination 112 and sized to house or retain coil windings 108. The windings 108 may be disposed within the slots 116 of the stator 102. In an electric machine motor example, current may be fed to the windings 108 to obtain a rotation force on the rotor 104. In an electric machine generator example, current generated in the windings 108 by a rotation of the rotor 104 may be removed to power vehicle components.

The rotor lamination 110 may define a plurality of permanent magnet openings (cavities) 118 disposed near the outer periphery of the rotor lamination 110 and each cavity 118 sized to receive a permanent magnet 120. It should be appreciated that the magnets 120 and the cavities 118 may include corresponding cross-sectional shapes perpendicular to the axis of rotation 122, such as the rectangular shapes shown, or alternatively arcuate shapes. Said magnets can also be substituted by a plurality of magnets, magnetized in the same direction such that the plurality of magnets absolve the same function of the original magnet. The rotor lamination 110 may further define a circular central opening 124 for receiving a driveshaft (not shown), as well as, one or more channels 126 configured to accommodate flow of cooling oil through the rotor 104.

Magnetic properties of a given material may be defined by its microcrystalline structure, such as, for example, its electron configuration and the tendency of the electrons to align their intrinsic magnetic moments, whether spontaneously or with an application of an external magnetic field, to point in the same direction. A permanent magnet may be a magnet that resists demagnetization when a magnetizing magnetic field is removed, i.e., exhibits retention of magnetic flux density Br. Given this useful property, permanent magnets find a variety of practical applications, such as, but not limited to, design of electric motor and/or generator for a hybrid electric vehicle, electric transformer design, design and manufacture of magnetic storage, e.g., a hard drive, and so on. A magnetically soft material may be a material that tends to demagnetize relatively quickly after an external magnetic field is removed. In contrast to the magnetically soft material, a permanent magnet may include a magnetically hard material capable of retaining magnetic properties after being magnetized, i.e., resisting demagnetization.

Rare-earth material alloys, such as neodymium-iron-boron (Nd—Fe—B) magnets and samarium-cobalt (Sm—Co) magnets, are examples of magnetically hard materials and may exhibit one or more of a plurality of desirable permanent magnet properties, such as a high coercivity $H_c$, high magnetic flux density B, and high energy product $(BH)_{max}$. Furthermore, a permanent magnet defining a composite, or a multiphase combination of one or more materials, may exhibit magnetic properties similar to those of the rare-earth material alloys. In one example, a composite permanent magnet may be designed to exhibit magnetic properties superior to those of magnets composed of the rare-earth material alloys alone. Constituent phases of a composite permanent magnet may be chemically similar, dissimilar, and/or may be separated by a distinct interface.

Figure 2A:
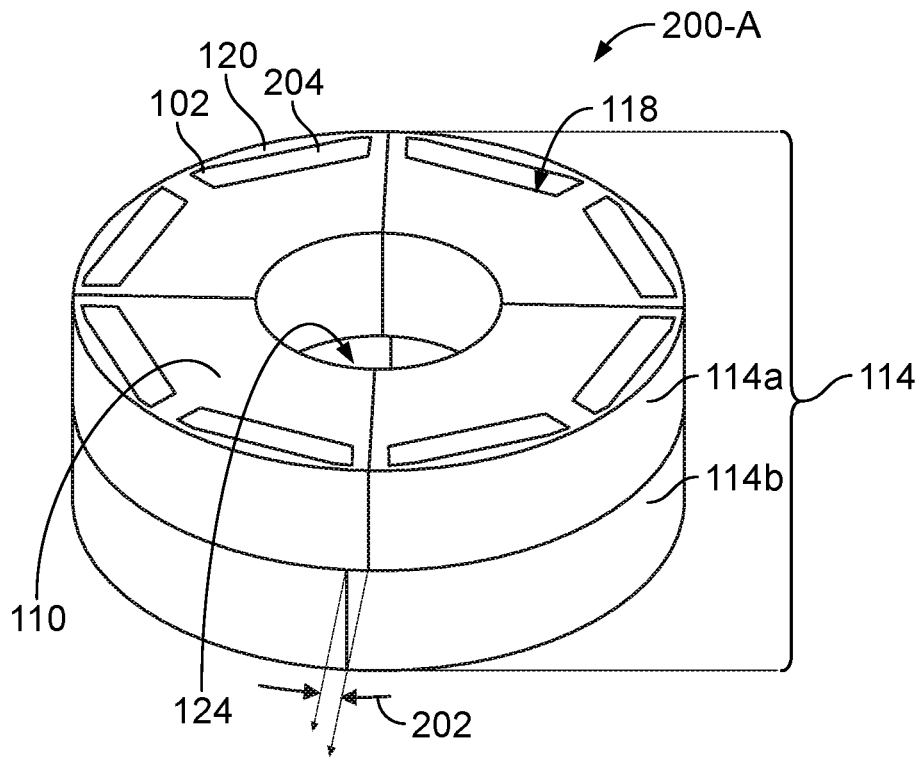
FIGS. 2A-2B are block diagrams illustrating rotor axial sections skewed with respect to one another.
Figure 2B:
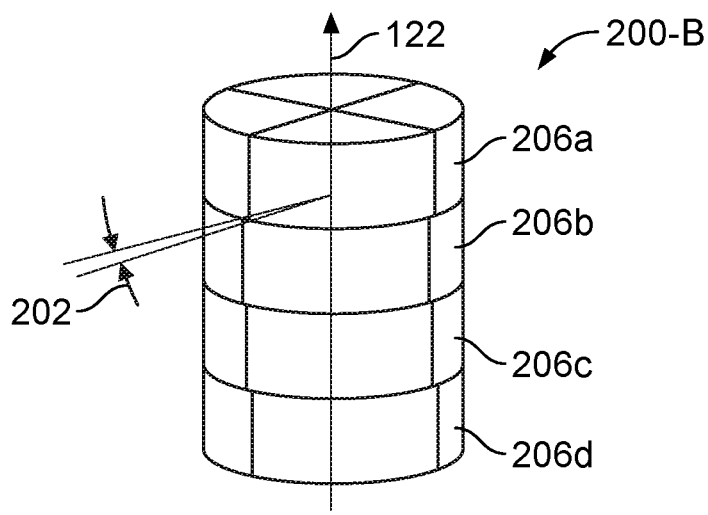

FIGS. 2A-2B illustrate example arrangements 200-A and 200-B, respectively, for performing axial skewing of a plurality of laminations 110 of the rotor 104. In one example, a strategy to reduce percent magnitude of torque ripple via rotor skewing may include offsetting (rotating or skewing) a first half 114a of the rotor lamination stack 114 with respect to a second half 114b. The half-stacks 114a, 114b may be rotated with respect to one another by a predefined axial rotation (skew) angle 202. For example, the axial skew angle 202 measured in mechanical degrees may be one-half of a slot pitch of the stator 102 having a predefined number $N_s$ of stator slots 116, or:

$$\text{angle}_{skew} = \frac{180°}{N_S}. \tag{1}$$

Thus, in an example rotor 104 operating in the stator 102 having 48 slots 116 the axial skew angle 202 may measure 3.75 degrees. The axial skewing may reduce a torque ripple component resulting from slotting of the stator 102. Furthermore, the example arrangement 200-B illustrated in FIG. 2B may include a plurality of axial sections 206a-206d of the rotor lamination stack 114 skewed with respect to each other by the axial skew angles 202a-202d, respectively, that are same or different from one another. The axial skewing 200-B, as illustrated in FIG. 2B, may alleviate or reduce rotor 104 and stator 102 torsional deformation as compared to other types of axial skewing, such as, for example, the axial skewing 200-A illustrated in FIG. 2A.

Moreover, in the rotor lamination stack 114 divided into a predefined number k of axial sections 206, the sections 206 may be rotated with respect to one another by an angle measured in mechanical degrees, such that:

$$\text{angle}_{skew}(k) = \frac{360°}{k \times N_S}. \tag{2}$$

A maximum relative rotation between any two axial sections 206 of a given rotor 104 may be determined using:

$$\text{angle}_{skew\_max}(k) = \frac{(k-1) \times 360°}{k \times N_S}. \quad (3)$$

Figure 2C:
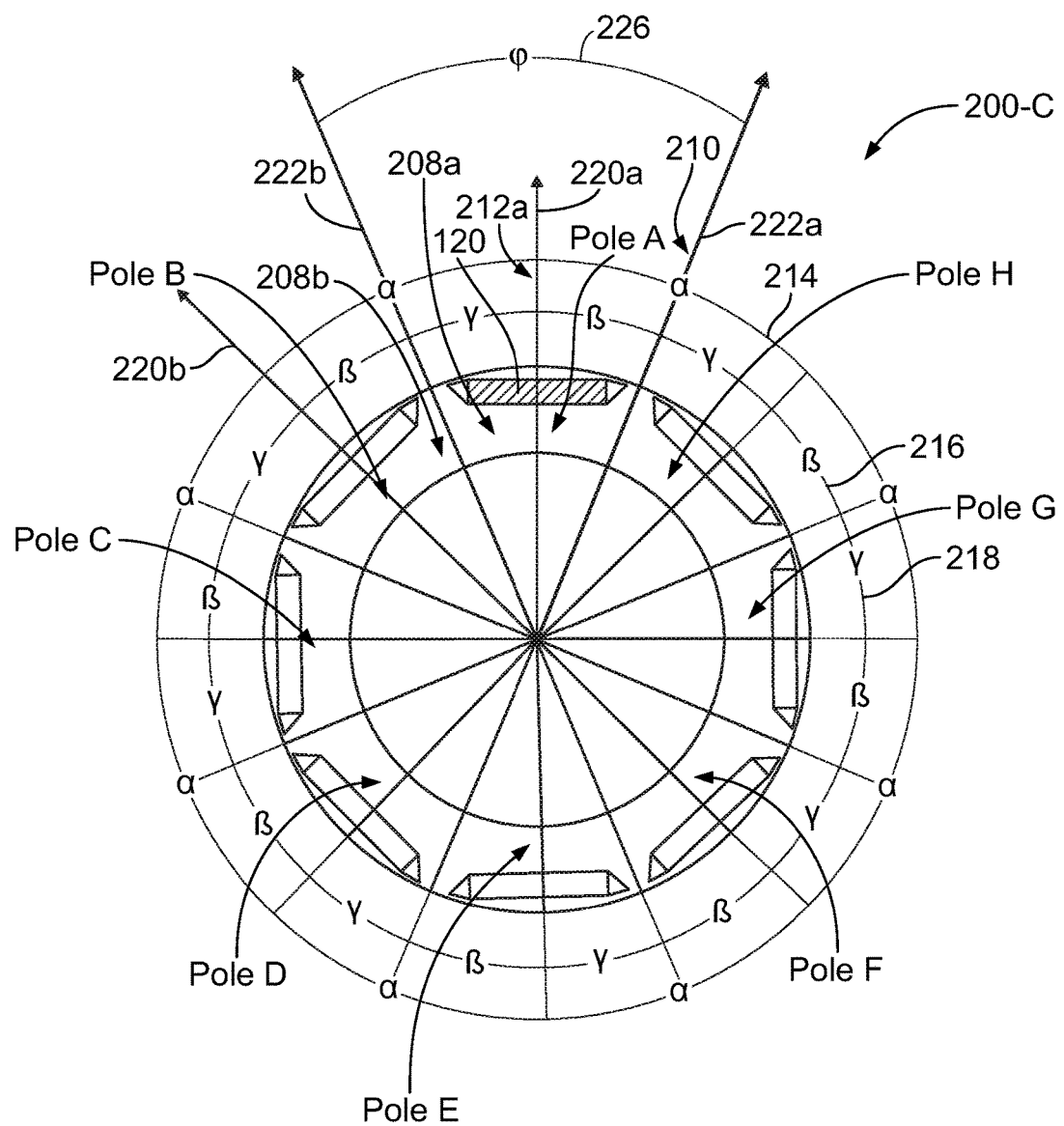
FIGS. 2C-2D are block diagrams illustrating example rotor lamination pole arrangements.

FIG. 2C illustrates an example arrangement 200-C of a plurality of poles 208 of the rotor lamination 110. A d-axis 220 may designate axis of symmetry of the rotor magnetic flux, and a q-axis 222 may designate axis that lie half-way between the pairs of magnets 120. In one example, the d-axis 220a may be aligned with a direction of magnetic flux of the North pole and the −d-axis 220b may be aligned with a direction of magnetic flux of the South pole. Additionally or alternatively, magnetic axis 212 of a given magnet 120 may lie along a center of magnetic flux of that magnet 120 and interpolar axis 210 may lie along a half-way point between each pair of adjacent magnets 120. As illustrated in FIG. 2C, the magnetic axis 212 of each magnet 120 may correspond to (or lie along) the d-axis (or −d-axis) 220 of the machine 100 and interpolar axis 210 may correspond to (or lie along) the q-axis (or −q-axis) 222 of the machine 100. In some other examples, as described in reference to at least FIG. 2D, the respective magnetic axis 212 of each of the magnets 120 may or may not lie along one of d-axis 220a and −d-axis 220b of the machine 100.

Thus, each pole 208 may be a portion of the lamination 110 disposed between adjacent interpolar axes 210 that are, in turn, disposed substantially between a pair of adjacent lamination cavities 118. The distance between a given pair of adjacent interpolar axes 210 may be indicative of a size of the pole 208 disposed therebetween and may be designated generally by an angle φ 226. Each pole 208 may further include respective magnetic axis 212 about a center of the permanent magnet 120 disposed within the cavity 118. Furthermore, if the rotor 104 design includes more than one magnet 120 per pole 208, the magnetic axis 212 is defined by the total flux produced by all the magnets 120 that reside in a given pole 208.

The poles 208 of the rotor lamination 110 illustrated in FIG. 2C may be distributed symmetrically with respect to one another. Thus, a first angle α 214 between the respective magnetic axis 212 of a pair of adjacent poles 208 may be the same for all pairs of adjacent poles 208. Furthermore, a given interpolar axis 210 and a pair of magnetic axes 212 adjacent to that interpolar axis 210 may define a second angle β 216 and a third angle γ 218, respectively, therebetween. The axial skewing may cause values of the second and third angles 216, 218 to be the same with one another, e.g., such that β=γ=½α=½φ. Furthermore, a sum of the second and third angles 216, 218 may correspond to a value of each of the first angle α 214 and the angle φ 226.

Figure 2D:
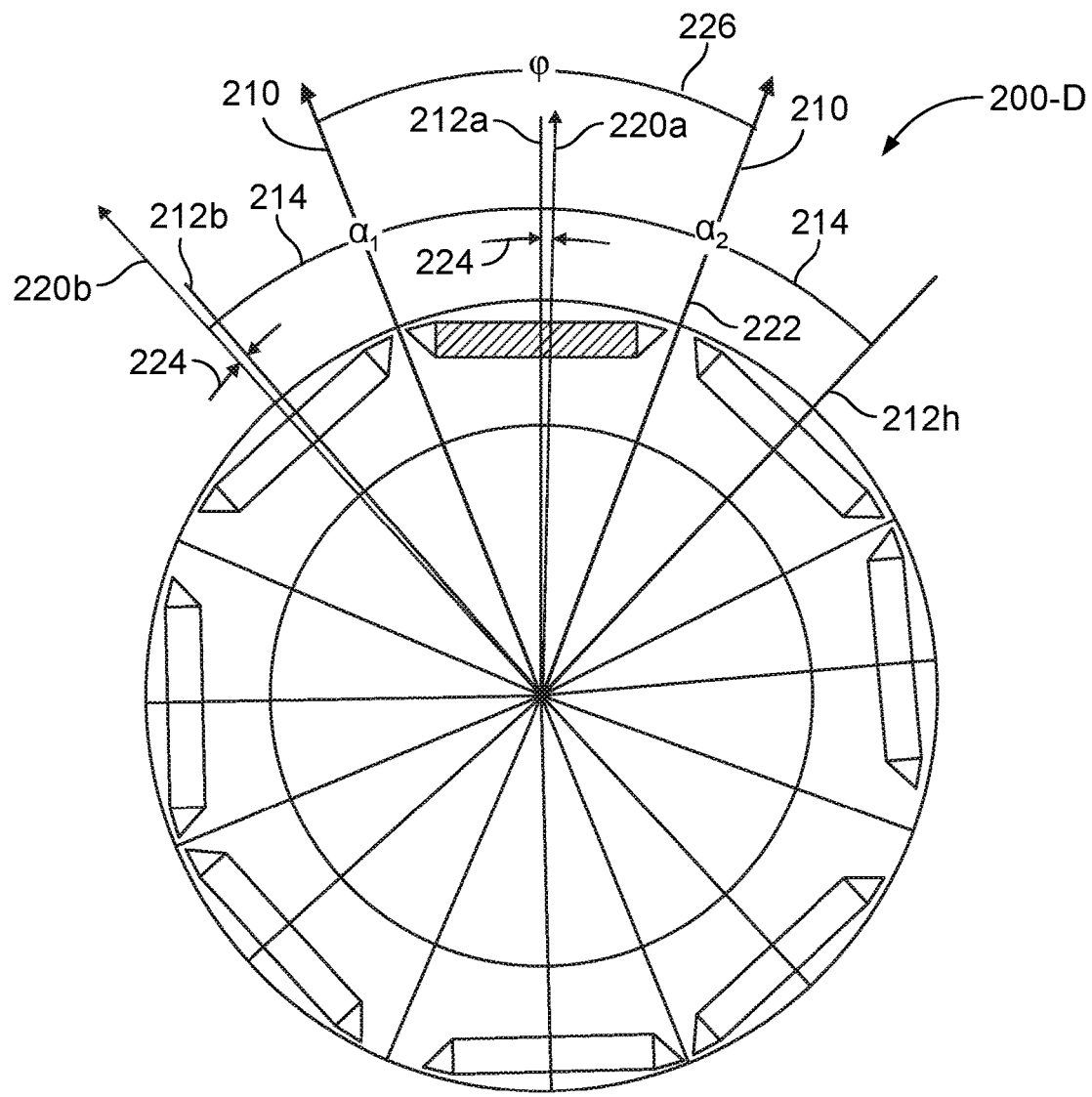

FIG. 2D illustrates an example arrangement 200-D of radial skewing the poles 208 with respect to the d- and q-axis 220, 222 of the rotor lamination 110. The radial skewing may include offsetting the magnetic axis 212 of a given rotor pole 208 with respect to the d-axis 220 of the rotor 104. Unlike with axial skewing where a number of the axial skewing angles 202 may be based on a number k of the axial sections 206 the rotor 104 may be divided into, the radial skewing applied to a given rotor 104 may include a number n degrees of freedom that corresponds to one less of a number $N_P$ of the rotor poles 208, or n=$N_P$−1.

Furthermore, when using radial skewing, the angles α 214 between respective magnetic axes 212 of pairs of adjacent poles 208 may be interdependent with one another in that a positive radial skewing applied to a first pair of adjacent poles 208 causes a negative radial skewing of an equal value to be applied to a second pair of adjacent poles 208 disposed adjacent the first pair. In one example, respective values of the angles α 214 between two adjacent pairs of poles 208 may be determined using:

$$\alpha_{skew\_pos} = \frac{360°}{N_P} + \text{angle}_{skew}, \quad (4)$$

and $$\alpha_{skew\_neg} = \frac{360°}{N_P} - \text{angle}_{skew}. \quad (5)$$

Thus, in an example 8-pole 48-slot machine 100 with a predefined skew angle of 3.50°, mechanical angles $\alpha_{skew\_pos}$ and $\alpha_{skew\_neg}$ may be 48.50° and 41.50°, respectively, and so on.

Figure 3A:
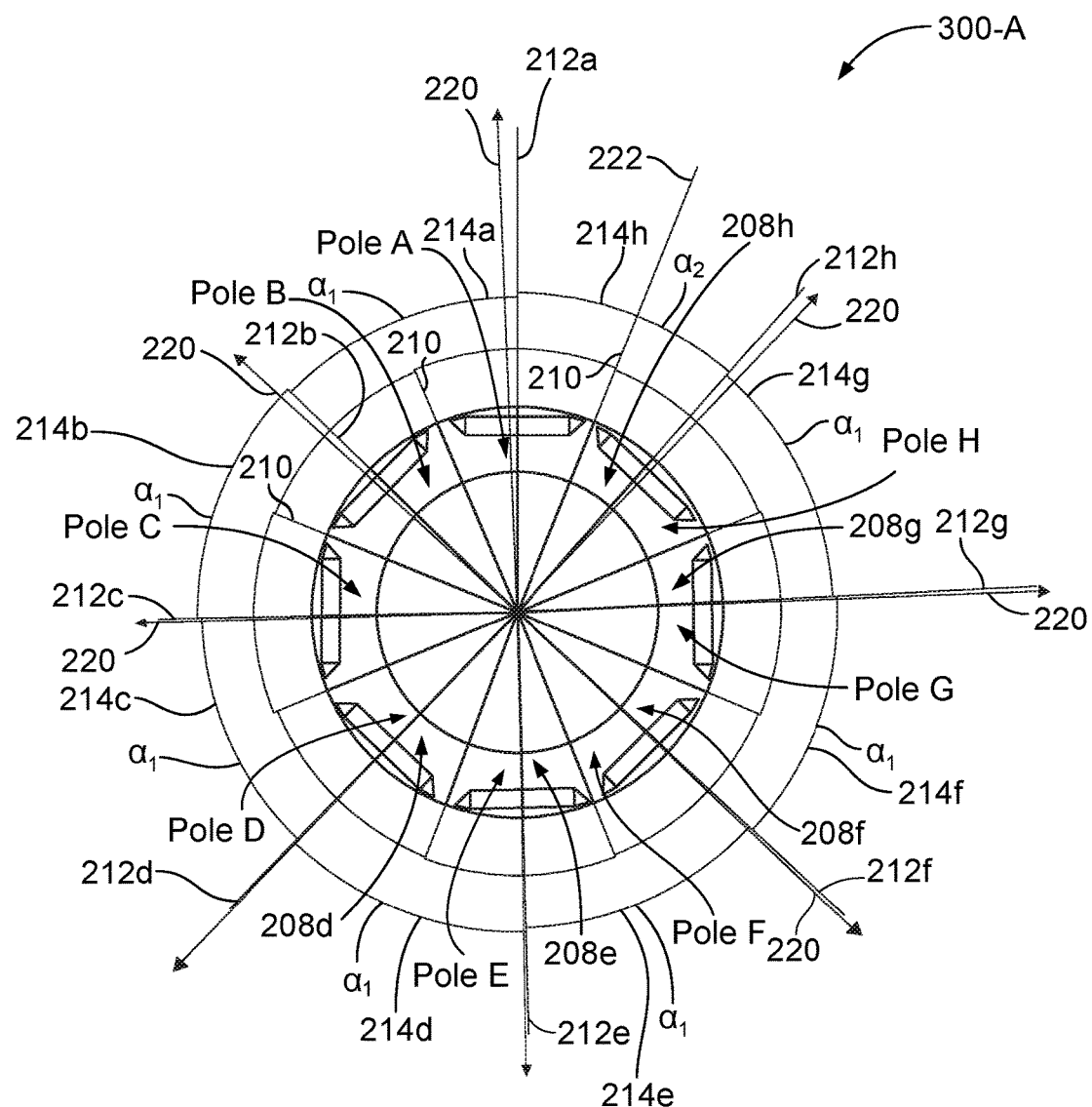
FIGS. 3A-3C are block diagrams illustrating radial skewing using a distribution of a skew angle among the poles.

FIG. 3A illustrates an example arrangement 300-A of radially skewed rotor poles 208 of the lamination 110. The arrangement 300-A may include the poles 208a-h that are radially skewed with respect to the d-axes 220 of the rotor 104 by a predefined skew angle, such that a value of the skew angle is distributed among several of the poles 208a-h.

More specifically, a value of the positive skew angle may be divided evenly among several of the pairs of adjacent poles 208a-h and a value of the negative skew angle may be applied to a single pair of adjacent poles 208a-h. In one example, the angles 214a-214g between the respective magnetic axis 212 of the pairs of adjacent poles 208a-h having a same value ai may be determined using:

$$\alpha_1 = \alpha_{skew\_distr} = \frac{360°}{N_P} + \frac{\text{angle}_{skew}}{N_P - 1}, \quad (6)$$

wherein quantity $$\frac{\text{angle}_{skew}}{N_P - 1}$$

defines a portion of the positive skew angle, hereinafter offset, applied to each of $N_P$−1 pairs of adjacent poles 208a-h. Furthermore, the angle 214h between the respective magnetic axis 212 of the adjacent poles 208a and 208h having a value $\alpha_2$ may reflect the negative skew angle having magnitude equal to that of the positive skew angle determined using:

$$\alpha_2 = \alpha_{skew\_neg} = \frac{360°}{N_P} - \text{angle}_{skew}. \quad (7)$$

Figure 3B:
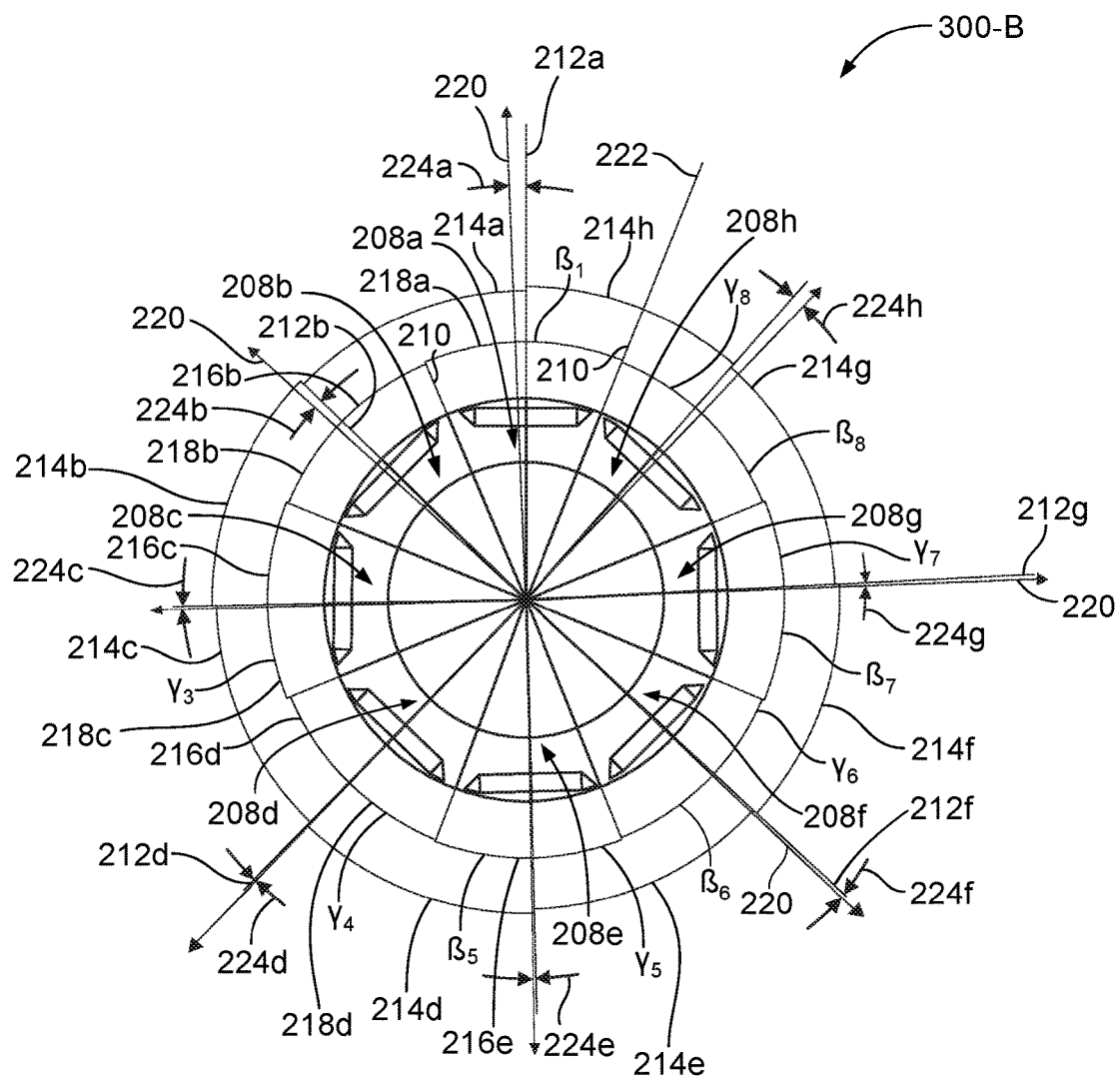

In one example, as illustrated in FIG. 3B, the angle $\alpha_1$ 214a between the first and second poles magnetic axes 212a and 212b may include the angle $\beta_2$ 216b and the angle $\gamma_1$ 218a. The angle $\beta_2$ 216b may be defined by the interpolar axis 210 between the poles 208a, 208b and the magnetic axis 212 of the second pole 208b. The angle $\gamma_1$ 218a may be defined by the interpolar axis 210 between the poles 208a, 208b and the magnetic axis 212a of the first pole 208a. As another example, the angle $\alpha_1$ 214b between the second and third poles 208b, 208c may include the angle $\beta_3$ 216c and the angle $\gamma_2$ 218b, each defined in a manner similar to that of the angles 216a, 218a, respectively. As still another example, the angles $\alpha_1$ 214c, 214d, 214e, 214f, 214g and $\alpha_2$ 214h may each include respective angles $\beta$ 216 and $\gamma$ 218 defined in a manner similar to the angles $\beta_3$, $\beta_2$, $\gamma_1$, $\gamma_2$, 216c, 216b, 218a, 218b making up the angles 214a, 214b.

Noting that the poles 208a-h of the arrangement 300-A have been radially skewed, e.g., as according to the Equations (6) and (7), affecting one or more distances between the pairs of adjacent poles 208, sums of the angles $\beta$ and $\gamma$ 216, 218 may correspond to values of the angles $\alpha_1$ and $\alpha_2$ as follows:

$$\alpha_1 = \beta_2 + \gamma_1 = \beta_3 + \gamma_2 = \beta_4 + \gamma_3 = \ldots = \beta_8 + \gamma_7, \quad (8)$$

and $$\alpha_2 = \beta_1 + \gamma_8. \quad (9)$$

While in a symmetrical pole 208 distribution described in reference to at least FIG. 2C the angles $\beta$, $\gamma$ 216, 218 are equal to one another, the relatively skewed angles $\beta_1$ 216a, $\beta_2$ 216b, $\beta_3$ 216c, $\beta_4$ 216d, $\beta_5$ 216e, $\beta_6$ 216f and $\beta_7$ 216g may have values different from those of one another and/or from that of $\beta_8$ 216h. The angles $\gamma_1$ 218a, $\gamma_2$ 218b, $\gamma_3$ 218c, $\gamma_4$ 218d, $\gamma_5$ 218e, $\gamma_6$ 218f and $\gamma_7$ 218g may have values different from those of one another and/or from that of $\gamma_8$ 218h.

Figure 3C:
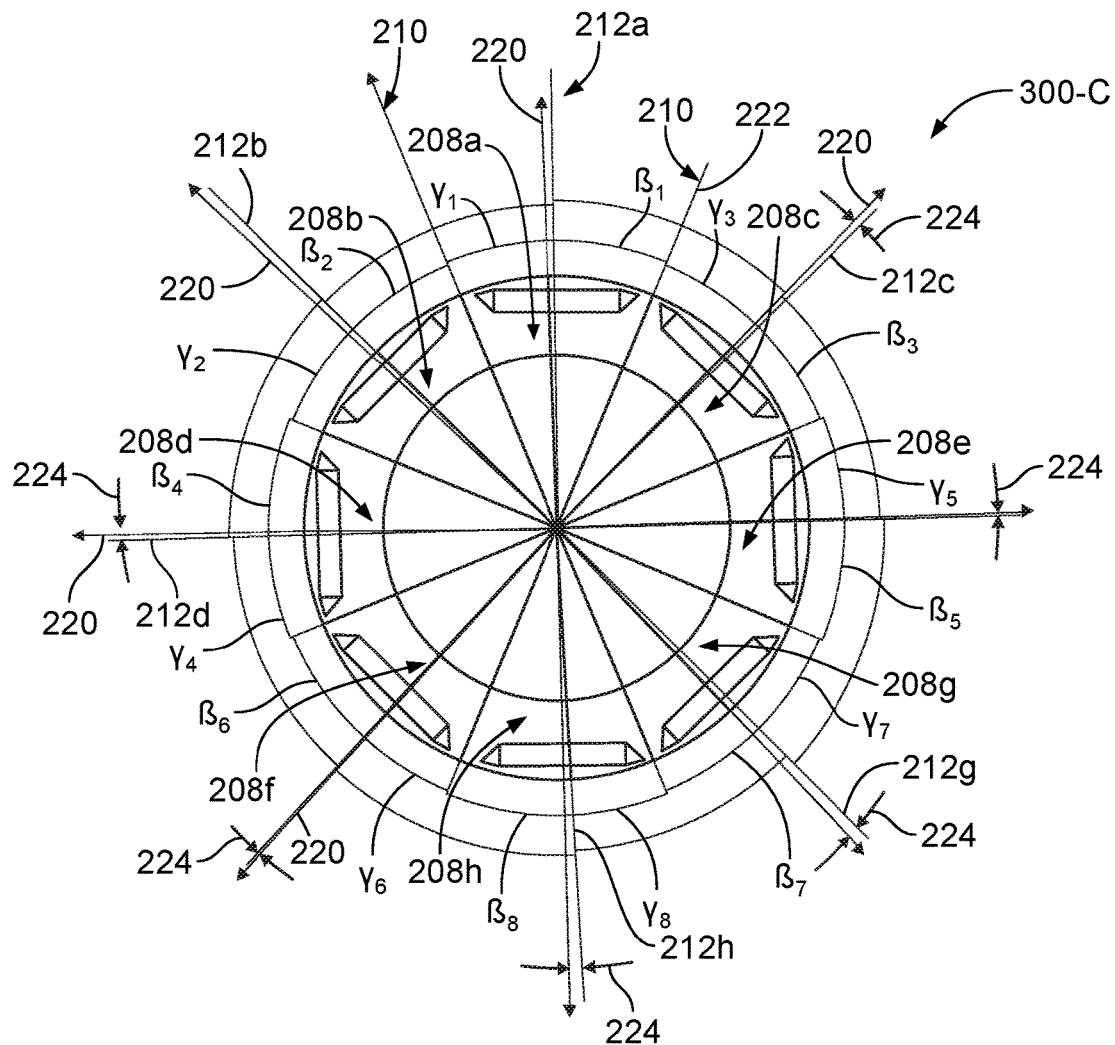

FIG. 3C illustrates an example arrangement 300-C for resequencing the poles 208a-h of FIGS. 3A-3B with respect to one another. The arrangement 300-C includes the pole 208c replacing (or occupying a former sequence position of) the pole 208h, the pole 208d replacing the pole 208c, the pole 208e replacing the pole 208g, the pole 208f replacing the pole 208d, the pole 208g replacing the pole 208f, the pole 208h replacing the pole 208e. Thus, an original sequence of the poles 208a-h of FIGS. 3A-3B, as viewed, for example, in a counterclockwise direction, is A-B-C-D-E-F-G-H and a rearranged sequence of FIG. 3C, as viewed in a same direction, is A-B-D-F-H-G-E-C.

The respective angles $\beta$, $\gamma$ 216, 218 of each of the poles 208a-h as measured between the magnetic axis 212 of a given pole 208 and the interpolar axes 210 defining outer boundaries of that pole 208 may remain the same during resequencing described in reference to FIG. 3C. In some instances, rearranging the poles 208a-h described in reference to FIGS. 3A-3B in a different sequence, such as the sequence 300-C, may provide a similar torque ripple magnitude reduction as the original pole sequences 300-A and/or 300-B. While the resequencing described in reference to FIG. 3C results in an example pole 208 pattern of A-B-D-F-H-G-E-C, different resulting pole patters are also contemplated. Furthermore, other sequencing arrangements, such as, but not limited to, resequencing such that the angles $\beta$, $\gamma$ 216, 218 of each of the poles 208a-h define a random value within a predefined range, are also contemplated.

Figure 4:
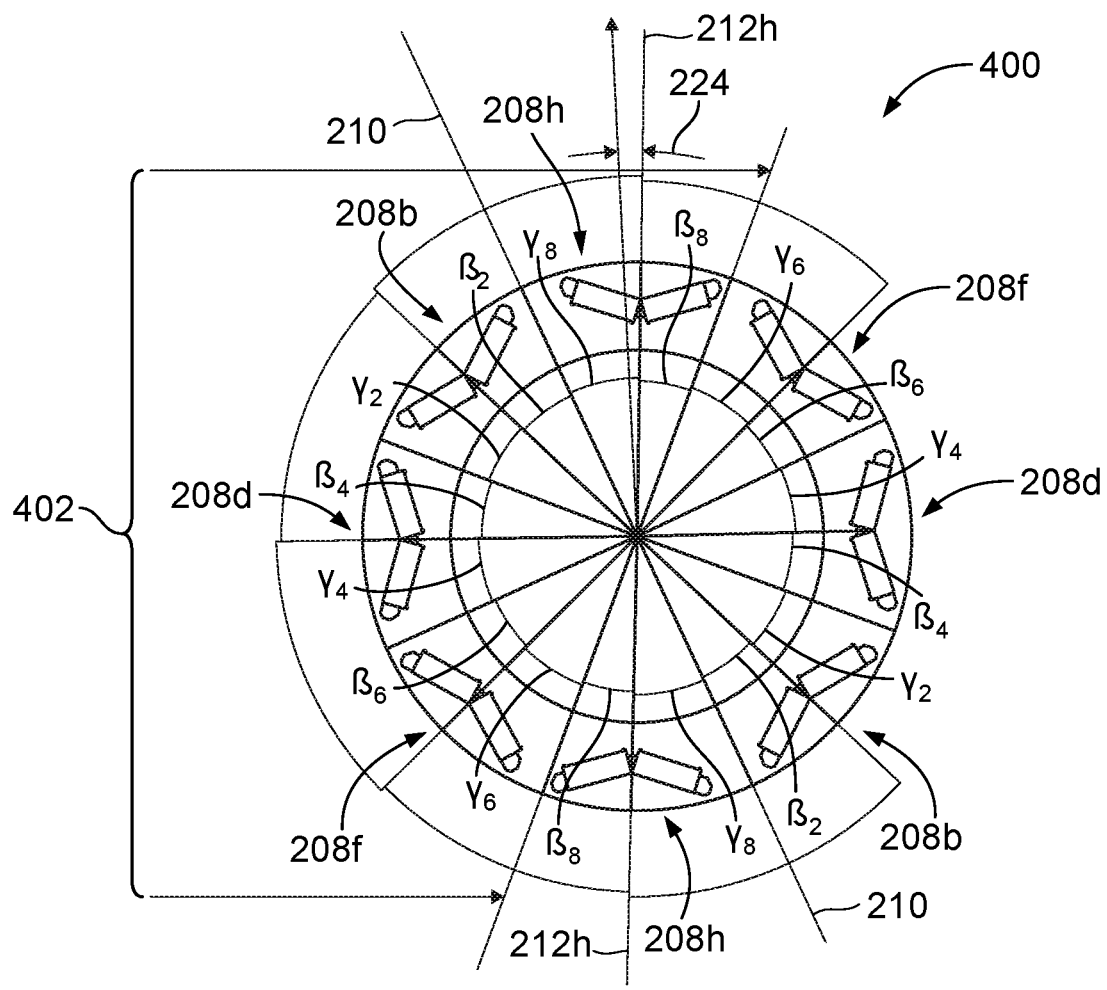
FIG. 4 is a block diagram illustrating a pole arrangement including a repeating sequence.

Maintaining full or partial symmetry of the magnet 120 arrangement with respect to the axis of rotation 122 may be beneficial in increasing rotor balancing and/or reducing noise vibration and harshness (NVH) and harmonics in the magnetic flux and in the induced voltage. FIG. 4 illustrates an example arrangement 400 of the plurality of poles 208 within the rotor lamination 110. In one example, the arrangement (or sequence) 400 of the poles 208 may be a predetermined pattern of poles 208 that includes a subset of sequences (hereinafter, subset) 402 being repeated a predefined number of times T throughout the arrangement 400.

The subset 402 may include a predefined number M of poles 208, wherein the number M is less than a total number $N_P$ of poles 208 within the rotor lamination 110. Furthermore, the number M may be such that the subset 402 may be repeated at least once within the arrangement 400, i.e., the number M of poles 208 in the subset is one-half the total number $N_P$ of poles 208 within the rotor lamination 110. The subset 402 of the lamination 110 having eight poles 208 may include four poles 208, e.g., the poles 208b, 208d, 208f, and 208h, sequenced in a pattern of B-D-F-H. The subset 402 is repeated immediately following the last pole 208 of the subset 402, e.g., immediately following the pole 208h, such that the resulting pole pattern of the arrangement 400 is B-D-F-H-B-D-F-H. In another example, the four poles 208 of the subset 402 may be the poles 208a, 208c, 208e, and 208g and the resulting pole pattern of the arrangement 400 may be A-C-E-G-A-C-E-G.

The arrangement 400 may cause one or more angles $\beta$, $\gamma$ 216, 218 to be substantially symmetrical with respect to the rotation axis 122 of the machine 100. In some examples, each of the angles $\beta$, $\gamma$ 216, 218 corresponding to the poles 208 of the subset 402 may be symmetrical with respect to the rotation axis 122, such that the angle $\gamma_8$ 218h defined by the magnetic axis 212h of the pole 208h and the interpolar axis 210 of the adjacent poles 208h, 208b may be symmetrical with respect to the rotation axis 122 to the angle $\gamma_8$ 218h and so on.

Figure 5:
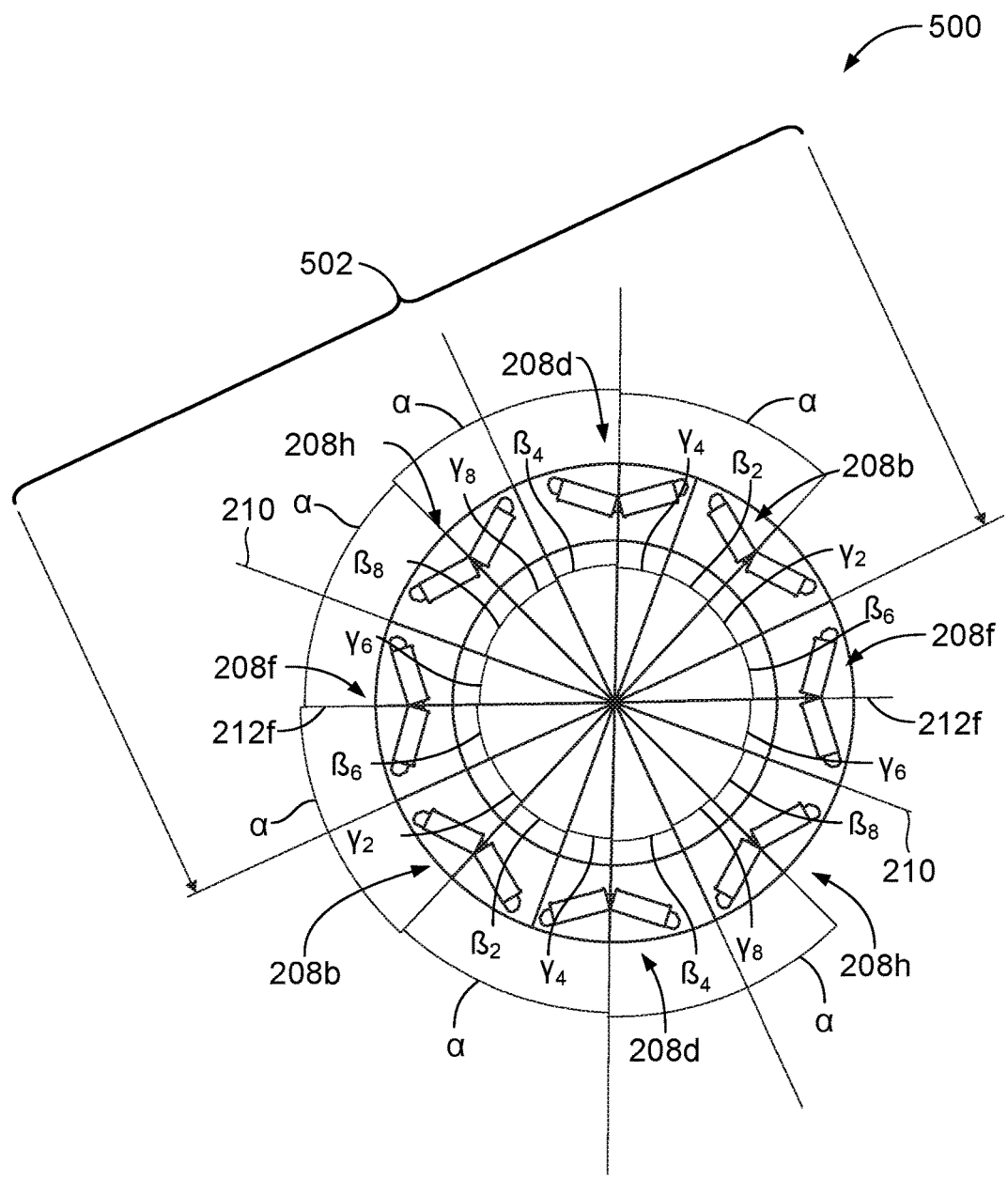
FIGS. 5-6 are block diagrams illustrating a repeated sequence pole arrangements having different orientations.

FIG. 5 illustrates an example arrangement 500 of the plurality of poles 208 within the rotor lamination 110. The arrangement 500 may be representative of symmetrically arranging the resequenced arrangement 300-C of A-B-D-F-H-G-E-C illustrated in FIG. 3C. In one example, the arrangement 500 may include a subset 502 of the sequence 300-C of B-D-H-F. The subset 502 of B-D-H-F may be further repeated a predefined number of times T throughout the pole 208 sequence of the arrangement 500, such that a resulting pole 208 sequence of the arrangement 500 may be B-D-H-F-B-D-H-F.

The arrangement 500 may cause one or more angles $\beta$, $\gamma$ 216, 218 to be substantially symmetrical with respect to the rotation axis 122 of the machine 100. In some examples, each of the angles $\beta$, $\gamma$ 216, 218 corresponding to the poles 208 of the subset 502 may be symmetrical with respect to the rotation axis 122, such that the angle $\gamma_6$ 218f defined by the magnetic axis 212f of the pole 208f and the interpolar axis 210 of the adjacent poles 208f, 208h may be symmetrical with respect to the rotation axis 122 to the angle $\gamma_6$ 218f and so on.

Additionally or alternatively, the resequenced arrangement 300-C may further be arranged in a repeating sequence such that the subset 502 is A-C-G-E and a resulting arrangement 500 may be A-C-G-E-A-C-G-E. While the poles 208 illustrated in FIGS. 4-5 as including a pair of magnets 120 arranged in a V-shape, application of the repeating sequence arrangement to flat, V-shaped, multi-layer magnets, and other magnet layouts is also contemplated.

While a rotor illustrated in FIGS. 3A-3B is an 8-pole rotor (i.e. characterized by 8 magnets or groups of magnets with alternating polarity), application of the repeating sequence arrangement to a rotor defining more or fewer poles is also contemplated. For example, a repeating sequence arrangement applied to a 16-pole rotor may include an ordered subset of 4 poles repeated a predefined number of times throughout a length of the sequence. Additionally or alternatively, a repeating sequence arrangement may include an ordered subset of 8 poles repeated a predefined number of times throughout a length of the sequence, e.g., A-B-D-F-H-G-E-C-A-B-D-F-H-G-E-C. Other combinations of pole subset patterns and/or numbers of poles 208 in a given pattern are also contemplated.

To further improve the harmonic and noise performance of the electric machine 100, a plurality of axial sections 206 of the rotor 104, with each section 206 including a plurality of laminations 110, may be rotated with respect one another by the axial skewing angle 202 that is a multiple of the angle φ 226, or a distance between the interpolar axes 210 defining at least one of the poles 208:

$$angle_{axial\_rotation} = \frac{360°}{N_P} \times \tau, \qquad (10)$$

where τ is a multiplier variable.

Additionally or alternatively, an initial orientation of the poles 208 within each of the axial sections 206 may differ prior to being rotated by the axial skewing angle 202. For example, one of the axial sections 206 may be rotated with respect to another by an angle corresponding to an angle of one-half of the number of the poles 208 in the subset. For instance, rotating the arrangement 500 of FIG. 5 by 90 degrees may result in an example repeating sequence arrangement 600 illustrated in FIG. 6, whereby the subset 502 of B-D-H-F becomes a subset 602 of H-F-B-D. In a manner similar to that of the subset 502, the sequence H-F-B-D of the subset 602 may be repeated a predefined number of times T throughout the pole 208 sequence of the arrangement 600, such that a resulting pole 208 sequence of the arrangement 600 may be H-F-B-D-H-F-B-D.

Furthermore, the symmetry of the angles β, γ 216, 218 of the subset 502 with respect to the rotation axis 122 may be preserved in the subset 602 since rotating the arrangement 500 to generate the arrangement 600 leaves unchanged the values of the angles β, γ 216, 218 of the poles 208. The first axial section 206a, as illustrated, for example, in FIG. 2B, that includes the laminations 110 having orientation of the arrangement 502 may be placed on top of, or otherwise combined with, the second axial section 206b that includes the laminations 110 having orientation of the arrangement 602, such that the pole 208d of the first section 206a may be aligned with the pole 208f of the second section 206b, the pole 208b of the first section 206a may be aligned with the pole 208h of the second section 206b, and so on. Other combinations, orientations, arrangements, and placement of the sections 206 with respect to one another are also contemplated.

Additionally or alternatively, prior to being combined with the first axial section 206a, the rotated second axial section 206b may be further rotated by an additional angle ψ (not shown), such that the combined axial sections 206a, 206b having the same pole pattern, nevertheless, have different angles β, γ 216, 218 in alignment with one another. In some instances, magnitude of the angle ψ may be much smaller, e.g., one-tenth or less, than that of the angle of rotation, i.e., the angle of one-half of the number of the poles 208 in the subset.

Still further, the first and second axil sections 206a, 206b may have a different pole arrangement from that of one another. Likewise, a given axial section 206 may include a plurality of laminations 110 having a different pole pattern from that of one another. In one example, the laminations 110 having a first pole arrangement of B-D-H-F-B-D-H-F may be combined with the laminations 110 having a second pole arrangement of A-C-G-E-A-C-G-E and so on. Other arrangements, sequences, and combinations, as well as, their relative orientations are also contemplated.

Figure 6:
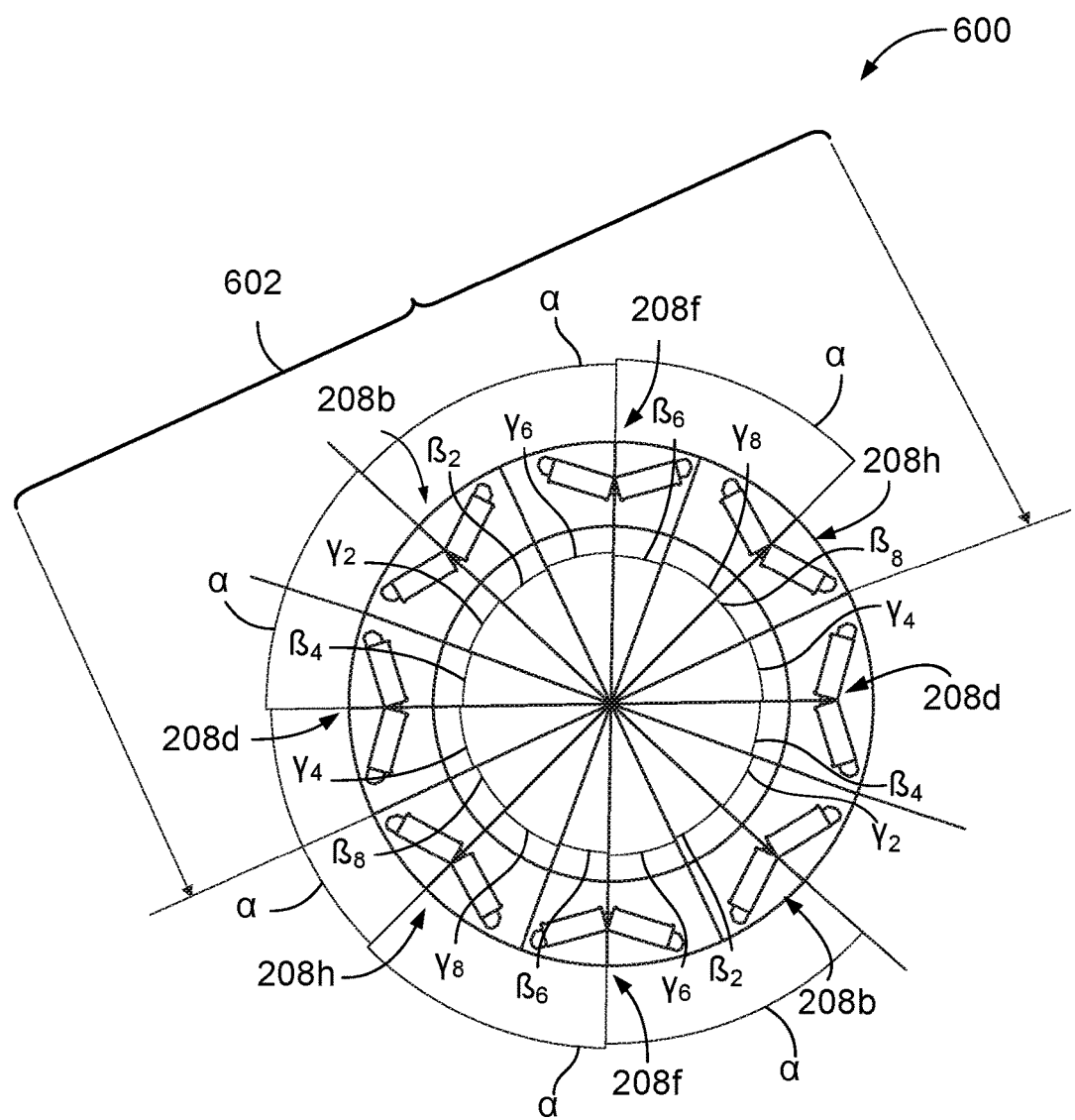

While the subsets 402, 502, 602 described in reference to FIGS. 4-6 each include an even number of poles 208, subsets including an odd number of poles 208 are also contemplated. Furthermore, the number of poles 208 in a given subset may determine whether the final sequence causes one or more angles β, γ 216, 218 of the poles 208 to be symmetrical with respect to the rotation axis 122.

Figure 7A:
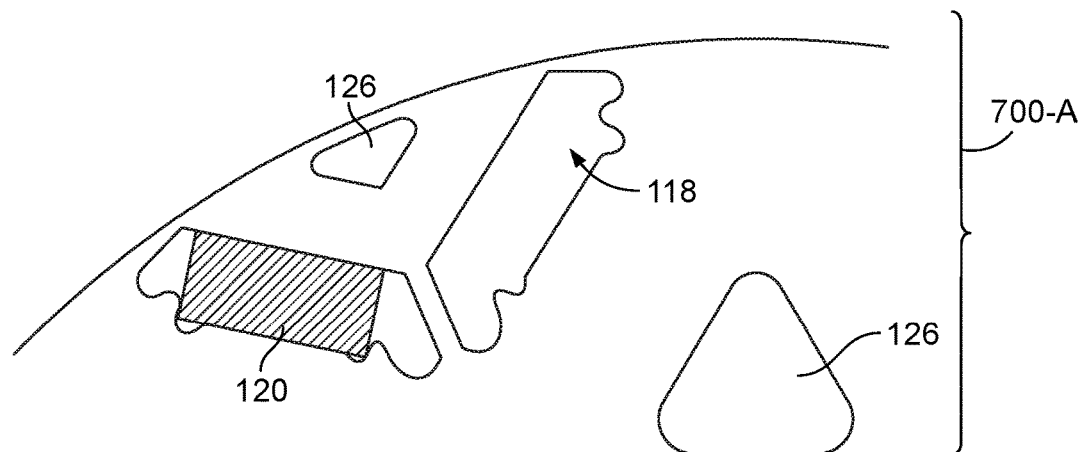
FIG. 7A is block diagram illustrating a portion of a rotor lamination with a cooling channel.
Figure 7B:
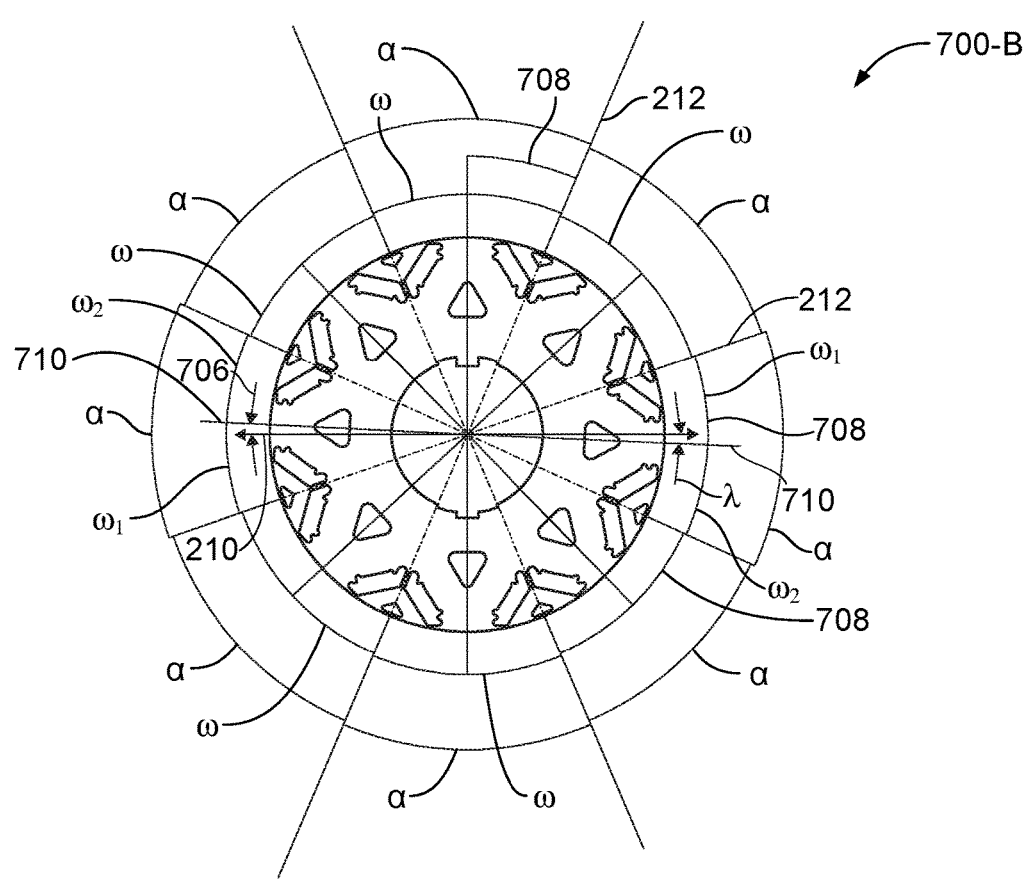
FIG. 7B is a block diagram illustrating a cooling channel arrangement including a repeating sequence.

FIG. 7A illustrates an example layout 700-A for a plurality of openings of the rotor lamination 110. In one example, the lamination 110 of the layout 700-A may include a plurality of cooling channels 126 configured to direct a cooling substance throughout one or more portions of the machine 100. FIG. 7B illustrates an example repeating sequence arrangement 700-B for the cooling channels 126 of the lamination 110. As one example, for the plurality of poles 208 arranged in a repeating sequence pattern, e.g., such that a magnitude of an angle between magnetic axis 212 of a given pole 208 and an interpolar axis 210 of that pole 208 and an adjacent pole 208 is equal to a magnitude of an angle defined by the same axes 210, 212 extended across the center opening 124 of the lamination 110, the cooling channels 126 may be arranged such that a center axis 710 of the cooling channels 126 is disposed half-way, i.e., $\omega_1 = \omega_2 = \frac{1}{2}\alpha$, between the pairs of adjacent poles 208. As another example, the center axis 710 of each of the cooling channels 126 may be offset from the interpolar axis 210 between a given pair of adjacent poles 208 by a predefined angle λ 706, such that the angle $\omega_1$ between the axis 710 of a given channel 126 and one of the adjacent magnetic axis 212 of the pole 208 is equal to the angle $\omega_1$ defined by the same axis 710, 212 extended through the center opening 124.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A rotor assembly comprising:
   a rotor including a plurality of laminations each defining a plurality of poles arranged such that values of a pair of angles corresponding to each of the poles and defined between a magnetic axis of the pole and respective interpolar axes adjacent thereto are different, the values of the pairs define a repeating sequence around the lamination, and the angles opposite an axis of rotation of the rotor are equal, wherein the laminations form a plurality of axial sections radially skewed with respect to one another by a predefined axial skew angle, and wherein respective magnitudes of the skew angles between two consecutive pairs of adjacent sections are different.

2. The rotor assembly of claim 1, wherein each of the magnetic axes lie along a magnetic flux center of a corresponding one of the poles, and each of the interpolar axes lies between an adjacent pair of the poles.

3. The rotor assembly of claim 1, wherein the poles are further arranged such that at least one of the magnetic axes is offset from a d-axis of the rotor that lies along a center of total magnetic flux, and each of the interpolar axes lies along one of q-axes of the rotor.

4. A rotor assembly comprising:
a plurality of laminations each defining a plurality of poles arranged such that values of a pair of angles corresponding to each of the poles and defined between a magnetic axis of the pole and respective interpolar axes adjacent thereto are different, wherein the laminations form a plurality of axial sections radially skewed with respect to one another by a predefined axial skew angle, and wherein respective magnitudes of the skew angles between two consecutive pairs of adjacent sections are different.

5. The rotor assembly of claim 4, wherein each of the magnetic axes lies along a magnetic flux center of a corresponding one of the poles, and each of the interpolar axes lies between an adjacent pair of the poles.

6. The rotor assembly of claim 4, wherein the poles are further arranged such that at least one of the magnetic axes is offset from a d-axis of the rotor assembly that lies along a center of total magnetic flux, and each of the interpolar axes lies along one of q-axes of the rotor.

7. A rotor assembly comprising:
a plurality of laminations defining a center opening sized to receive a shaft therethrough along a rotation axis, and defining a plurality of magnet openings sized to receive permanent magnets to form magnetic poles, wherein the magnet openings are arranged such that pairs of angles defined between a magnetic axis corresponding to each of the poles and interpolar axes adjacent thereto are different in value, and the values of the pairs define a repeating sequence around the lamination, wherein the laminations form a plurality of axial sections radially skewed with respect to one another by a predefined axial skew ankle, and wherein respective magnitudes of the skew angles between two consecutive pairs of adjacent sections are different.

8. The rotor assembly of claim 7, wherein each of the magnetic axes lies along a magnetic flux center of a corresponding one of the poles, and each of the interpolar axes lies between an adjacent pair of the poles.

9. The rotor assembly of claim 7, wherein the openings are further arranged such that at least one of the magnetic axes is offset from a d-axis of the rotor assembly that lies along a center of total magnetic flux, and each of the interpolar axes lies along one of q-axes of the rotor.

* * * * *